July 25, 1967 M. E. HOLMGREN 3,332,447
HOSE CONSTRUCTION
Filed Oct. 2, 1964
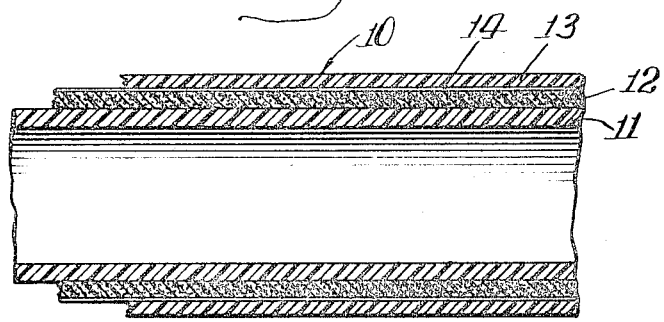 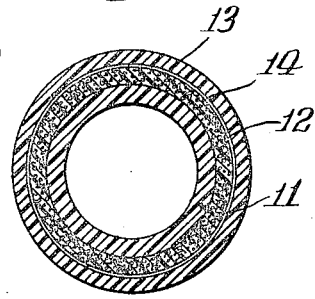
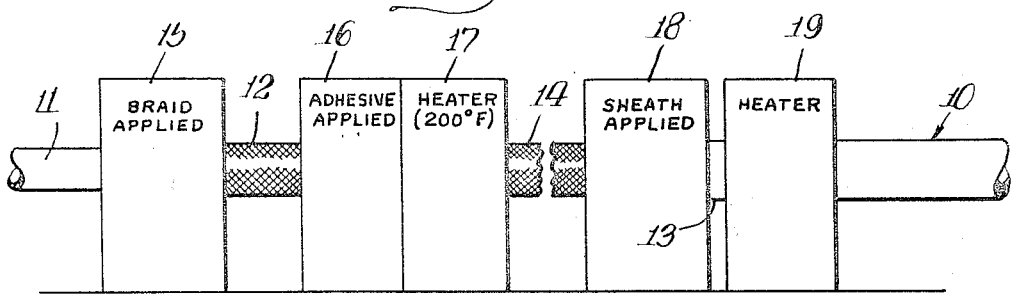
INVENTOR.
Marvin E. Holmgren
BY
Holgren, Wegner, Allen,
Stellman & McCord Attys.

United States Patent Office 3,332,447
Patented July 25, 1967

3,332,447
HOSE CONSTRUCTION
Marvin E. Holmgren, Manitowoc, Wis., assignor to Imperial-Eastman Corporation, a corporation of Illinois
Filed Oct. 2, 1964, Ser. No. 401,146
11 Claims. (Cl. 138—125)

ABSTRACT OF THE DISCLOSURE

A composite hose structure and a method of making such structure where the structure has a tubular core element, e.g., nylon, surrounded by a linkable plastic, e.g., Dacron, tension applied braid element which reinforces the core and is usually in direct nonadhesive contact with the core and a sheath element of heat fusible plastic, e.g., polyurethane, which is formed on and adhesively secured to the braid by a cured pressure applied adhesive mixture of heat fusible material, e.g., polyurethane, and cross-linking agent, e.g., polyester. In the adhesive, the fusible material of the adhesive adheres to the sheath and the cross-linking agent adheres to the braid material.

This invention relates to hose constructions and in particular to a bonded multilayer hose construction.

In one form of hose construction, a tubular core is reinforced by a surrounding braid which in turn is protected by a surrounding sheath. The braid provides improved strength in the hose and the sheath provides abrasion resistance and desired wear qualities therein. In one specific construction of such a hose, the tubular core is formed of a plastic such as nylon, and more specifically nylon-11, the braid is formed of a plastic such as a polyester plastic, and more specifically a terephthalate polyester resin (commercially sold in the United States as "Dacron"), and the sheath is formed of a suitable protective plastic material which may be comprised of a mixture of polyurethane plastic and vinyl plastic.

The present invention comprehends an improved hose structure utilizing such core, braid, and sheath elements and including an improved means for securing a number of the elements to each other in the completed hose structure. More specifically, the present invention comprehends an improved hose structure including improved means for securing the sheath to the braid therein.

Thus, a principal object of the present invention is the provision of a new and improved hose structure and method of forming the same.

Another object of the invention is the provision of such a hose structure having new and improved means for securing a sheath element to a reinforcing braid element thereof.

A further object of the invention is the provision of such a hose structure wherein the securing means comprises an adhesive joining the sheath and braid by at least two different modes of securing.

Another object of the invention is the provision of such a hose structure wherein one of the modes of securing comprises a fusing of a heat fusible one of the elements to a heat fusible portion of the adhesive.

A further object of the invention is the provision of such a hose structure wherein another of the modes of securing comprises the cross-linking of a cross-linkable one of the elements with a cross-linking agent portion of the adhesive.

Still another object of the invention is the provision of such a hose structure comprising a tubular core element, a braid element surrounding and reinforcing the core element, a sheath element surrounding the braid element, at least one of the elements being heat fusible and at least one of the elements being linkable with a cross-linking agent, and an adhesive securing the hose elements together, the adhesive being a mixture of a heat fusible material and cross-linking agents, the heat fusible material of the adhesive being heat fused with a heat fusible one of (a) the core element, (b) the braid element, and (c) the sheath element, and the cross-linking agents being cross-linked with a linkable one of (a) the core element, (b) the braid element, and (c) the sheath element.

A yet further object of the invention is the provision of such a hose structure comprising a tubular core, a polyester braid surrounding and reinforcing the core, a sheath formed of a mixture of polyurethane and vinyl plastic surrounding the braid, and an adhesive securing the sheath to the braid, the adhesive being a mixture of polyurethane and polyester cross-linking agents the polyurethane of the adhesive being heat fused with the polyurethane of the sheath and the polyester cross-linking agents being linked with the braid.

Still another object of the invention is the provision of a new and improved method of forming such a hose structure comprising the steps of providing a tubular core, applying a plastic braid under tension about the core element, the braid being formed of a material linkable with a cross-linking agent, applying an adhesive under pressure to the braid, the adhesive being comprised of a mixture of a heat fusible material and a cross-linking agent, forming a plastic sheath surrounding the braid element, the sheath being formed at least in part of a material heat fusible with the heat fusible material of the adhesive, and heating the sheath and adhesive to fuse the same.

Other objects and advantages of the invention will be apparent from the following description taken in connection with the accompanying drawing wherein:

FIGURE 1 is an elevation of a hose structure embodying the invention with portions thereof broken away to illustrate the layered construction thereof;

FIGURE 2 is a fragmentary enlarged diametric section of the hose construction;

FIGURE 3 is a transverse section thereof; and

FIGURE 4 is a schematic apparatus diagram illustrating the method of forming the hose structure embodying the invention.

In the exemplary embodiment of the invention as disclosed in the drawing, a hose structure generally designated 10 is shown to comprise a tubular core element 11, a braid element 12 surrounding and reinforcing the core element, and a sheath element 13 surrounding the braid element. In the illustrative embodiment of the invention, the core element is formed of a suitable plastic, the braid 12 is formed of a plastic material which is cross-linkable with suitable plastic cross-linking agents, and the sheath 13 is formed of a material including a heat fusible plastic material.

The present invention comprehends the provision in the hose structure 10 of an adhesive 14 which secures together at least two elements of the hose structure. The adhesive effects a novel securing thereof by providing a plurality of different modes of securing. More specifically, the adhesive 14 is arranged to provide both cross-linking and heat fusible modes of securing together of the hose structure elements.

In the specific embodiment of the invention herein disclosed, the core is formed of a flexible, strong plastic such as nylon-11 (11-aminoundecanoic acid). The braid is formed of a terephthalate polyester resin, and the sheath is formed of a mixture of plastic materials including polyurethane. More specifically, the sheath may be formed of an improved composition comprising about 20 weight parts of solid polyvinyl chloride homopolymer (e.g. Geon 101EP) and about 80 weight parts of a tough essentially linear polyesterurethane elastomer substantially free of cross-links and substantially soluble in dimethyl formamide. The elastomer may comprise the reaction product obtained by heating at 140° C. for 3.5 hours a mixture of 1.704 mols of hydroxyl poly(tetramethylene adipate) of a molecular weight of about 849, hydroxyl number 130.4, acid number 0.89 and containing about 1.218 mols of free butanediol-1,4, and about 2.92 mols of diphenyl methane-p,p'-diisocyanate. The reaction product preferably contains essentially no unreacted groups of the class consisting of isocyanate and hydroxyl groups.

The adhesive 14 may comprise a mixture of polyurethane dissolved in a suitable solvent such as acetone, and cross-linking polyester agents. In one specific example found to provide an excellent hose structure, the adhesive 14 comprises a mixture of 25 parts by weight of polyesterurethane (B. F. Goodrich Estane 5703), 10 parts by weight of a bisphenol A fumarate type polyester polymer, and .2 parts by weight of benzoyl peroxide. The above solids are diluted to a workable viscosity in acetone, the solvent being approximately 75% by weight of the final adhesive mixture.

Where somewhat slower drying of the adhesive is permissible other solvents such as methyl ethyl-ketone may be substituted for the acetone. Further, other resins may be employed for linking with the braid material, as will be obvious to those skilled in the art. Further, if desired, the core may be formed of a heat fusible or cross-linkable material to permit securing of the braid to the core by the adhesive.

Referring now to FIGURE 4, a novel method of forming the hose structure 10 is shown to comprise the steps of firstly applying the braid 12 under tension about the tubular core 11 by means of a conventional braid applying apparatus 15. The adhesive 14 is then applied to the braid under pressure by means of a suitable conventional adhesive applying apparatus 16. The adhesive coated hose structure is then heated to approximately 200° F. for approximately one minute to drive off the solvent and cause the cross-linking agents of the adhesive to cross-link with the polyester braid. The heating may be performed in a conventional heating apparatus 17 arranged to heat the hose structure to at least approximately 160° F. and below approximately 225° F. to effect the desired driving off of the solvent. The core and braid structure with the dried adhesive thereon is then in condition for application of the sheath. The structure may be stored in this condition for subsequent application of the sheath, or may be delivered directly to a conventional sheath applying apparatus 18 for application of the sheath upon completion of the drying of the adhesive.

Apparatus 18 may comprise a conventional extruding apparatus arranged to extrude the plastic sheath material about the braid at a relatively high temperature such as approximately 345° F. The heat of such extrusion is substantially sufficient to effect a heat fusion of the polyurethane of the sheath with the polyurethane of the adhesive. However, improved bonding of the polyurethane material is achieved by curing the structure at an elevated temperature in a suitable conventional heating apparatus 19. Illustratively, the apparatus 19 may be arranged to cure the hose structure at 350° F. for 10 additional minutes, at 300° F. for an additional 20 minutes, or at approximately 210° F. for approximately 4 hours. Alternatively, the apparatus 19 may be omitted where a suitable catalyst is added to the adhesive.

Thus, in the completed hose structure 10, the polyester braid is cross-linked with the cross-linking agents in the adhesive 14 and the polyurethane portion of the sheath is heat fused with the heat fusible portion of the adhesive. In the illustrated embodiment, the adhesive does not bond to the nylon core, and, thus, desirable slippage may be effected between the braid and the core providing an improved hose structure.

Thus, hose structure 10 comprises an improved structure having an improved sheath-reinforcing braid securing. The structure is extremely simple and economical of manufacture while yet providing improved abrasion resistance, strength, and flexibility.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. A composite hose structure comprising:
a tubular core element;
a braid element surrounding and reinforcing the core element;
a sheath element surrounding the braid element, at least one of said elements being heat fusible and at least one of said elements beink linkable with a cross-linking agent; and
an adhesive securing said hose elements together, said adhesive being a mixture of a heat fusible material and cross-linking agents, the heat fusible material of the adhesive being heat fused with a heat fusible one of (a) the core element, (b) the braid element, and (c) the sheath element, and the cross-linking agents being cross-linked with a linkable one of (a) the core element, (b) the braid element, and (c) the sheath element.

2. A composite hose structure comprising:
a tubular core;
a braid element surrounding and reinforcing the core;
a sheath element surrounding the braid element, one of said elements being heat fusible and another one of said elements being linkable with a cross-linking agent; and
an adhesive securing the sheath to the braid, said adhesive being a mixture of a heat fusible material and cross-linking agents, the heat fusible material of the adhesive being heat fused with the heat fusible one of said elements, and the cross-linking agents being cross-linked with the linkable one of said elements.

3. The hose structure of claim 2 wherein said elements are formed of organic plastic materials.

4. The hose structure of claim 2 wherein said braid is formed of a polyester plastic material and said cross-linking agents comprise cross-linking polyester agents.

5. The hose structure of claim 2 wherein said sheath is formed at least in a substantial part of polyurethane plastic material and the heat fusible material of the adhesive comprises polyurethane.

6. The hose structure of claim 2 wherein said braid element is under substantial tension about said core, with said adhesive and sheath being substantially tension-free thereabout.

7. The hose structure of claim 2 wherein said adhesive is disposed within the interstices of the braid element and disposed in surrounding relationship thereto.

8. A composite hose structure comprising:
a tubular core;
a braid element directly contacting surrounding and reinforcing the core;
a sheath element surrounding the braid element, at least one of said elements being heat fusible and at least one of said elements being linkable with a cross-linking agent; and
an adhesive securing the sheath to the braid, said adhesive being a mixture of a heat fusible material and cross-linking plastic agents, the heat fusible material of the adhesive being heat fused with each heat fusible element, and the cross-linking agents being cross-linked with each linkable element.

9. A composite hose structure comprising:
a tubular core;
a polyester braid surrounding and reinforcing the core;
a sheath surrounding the braid element, said sheath being formed of a mixture of polyurethane and vinyl plastic; and an adhesive securing the sheath to the braid, said adhesive being a mixture of polyurethane and polyester cross-linking agents, the polyurethane of the adhesive being heat fused with the polyurethane of said sheath, and the polyester cross-linking agents being linked with said braid.

10. The composite hose structure of claim 1 wherein said adhesive is in pressure applied association with said braid.

11. The composite hose structure of claim 1 wherein said heat fusible adhesive material is fused with said sheath element by heat energy of extrusion of the plastic sheath element.

References Cited

UNITED STATES PATENTS

| | | | |
|---|---|---|---|
| 3,051,598 | 8/1962 | Chipman et al. | 156—325 X |
| 3,116,760 | 1/1964 | Matthews | 138—125 |
| 3,159,183 | 12/1964 | Brumbach | 138—125 |

LAVERNE D. GEIGER, *Primary Examiner.*

C. L. HOUCK, *Assistant Examiner.*